United States Patent [19]

Narayan

[11] Patent Number: 5,264,620
[45] Date of Patent: Nov. 23, 1993

[54] PREPOLYMER COMPOSITIONS DERIVED FROM LIQUID METHYLENE BIS (PHENYLISOCYANATE) AND POLYTETRAMETHYLENE ETHER GLYCOL

[75] Inventor: Thirumurti Narayan, Grosse Ile, Mich.

[73] Assignee: BASF Corporation, Parsippany, N.J.

[21] Appl. No.: 666,821

[22] Filed: Mar. 8, 1991

Related U.S. Application Data

[63] Continuation-in-part of Ser. No. 446,846, Dec. 6, 1989, abandoned.

[51] Int. Cl.$^5$ ............................................. C07C 251/00
[52] U.S. Cl. ..................................................... 560/351
[58] Field of Search ......................................... 560/351

[56] References Cited

U.S. PATENT DOCUMENTS 4,115,429  9/1978  Reiff et al. .
4,386,032  5/1983  Hughes et al. .
4,478,960  10/1984  Buethe et al. .

*Primary Examiner*—Alan Siegel
*Attorney, Agent, or Firm*—William G. Conger

[57] ABSTRACT

The present invention is a prepolymer or quasi-prepolymer formed from the reaction of a given amount of a diphenyl methane diisocyanate having at least 5 percent of the 2,4'-isomer and polytetramethylene ether glycols having a molecular weight between 162 and 3000. The glycol which may be combined with other polyether or polyester glycols. The resulting NCO-terminated prepolymer or quasi polymer is a liquid which is stable at temperature of 15° C. for at least 24 hours.

15 Claims, No Drawings

PREPOLYMER COMPOSITIONS DERIVED FROM LIQUID METHYLENE BIS (PHENYLISOCYANATE) AND POLYTETRAMETHYLENE ETHER GLYCOL

This application is a continuation-in-part of copending U.S. Pat. application Ser. No. 07/446,846 filed Dec. 6, 1989 now abandoned.

BACKGROUND OF THE INVENTION

1. Field of the Invention

The present invention pertains to prepolymers and quasi-prepolymers for use in the preparation of coatings, sealants, etc. More particularly, the present invention concerns prepolymers and quasi-prepolymers useful in the preparation of polyurethane coatings and sealants. Even more particularly, the present invention relates to new prepolymer and quasi-prepolymer compositions derived from diphenylmethane diisocyanates (MDI) and polytetramethylene ether glycols of various molecular weights, which are liquid at temperatures of −20° C. to 15° C.

Numerous prepolymer and quasi-prepolymer compositions are known for use in the manufacture of polyurethane coatings, sealants, etc., as well as other polymeric compounds.

Generally, the most important diisocyanates which are readily available on a large commercial scale are the 4,4'- diphenylmethane diisocyanate and the 2,4'-isomer which melt at 39° C. and 34.5° C. respectively. Liquid diisocyanates are highly useful and attempts have been made to liquify both 4,4'-diphenylmethane diisocyanate and mixtures of 4,4'-diphenylmethane diisocyanate and small amounts of the 2,4'-isomer. A serious drawback to these compositions is that the adducts crystalize anywhere from 5° C. to as high as 25° C., and are difficult to liquify once they have solidified.

Diisocyanate compounds which are the reaction products of a diphenylmethane diisocyanate containing at least 15% by weight of the 2,4'-isomer with either propylene glycol or a poly-1,2-propylene ether glycol are taught in U.S. Pat. No. 4,118,411. These diisocyanate compounds are stable and liquid at −5° C. for at least 48 hours. However, these diisocyanates are not suitable for many purposes requiring storage stable diisocyanates.

U.S. Pat. No. 4,115,429 to Reiff et. al. discloses novel prepolymers and quasi-prepolymers stable at low temperatures which are derived from the reaction of methylene bis(phenylisocyanate) having at least 20 percent by weight up to 70 percent by weight of 2,4'MDI content with polyoxyethylene glycols having molecular weights of from 150 to 1500. However, the polyoxyethylene glycols are hydrophilic segments which may create compatibility problems with other system components.

It is to be appreciated, therefore, that there still exists a need for other prepolymers and quasi-prepolymers which exhibit low temperature stability and which are useful in the preparation of elastomers, coatings, sealants, foams and the like having better end use properties than those based on either polyethylene glycol or polypropylene glycol.

SUMMARY OF THE INVENTION

The present invention provides liquid, low temperature stable prepolymers and quasi-prepolymers which are derived from the reaction of (a) methylene bis(phenylisocyanate) containing at least percent by weight of 2,4'-methylene bis(phenylisocyanate) and (b) a polytetramethylene ether glycol, to provide NCO-terminated prepolymers and quasi-prepolymers having from about 5 to about 90 percent, by weight, 2,4'-methylene bis(phenylisocyanate).

The polytetramethylene ether glycol hereof includes polytetramethylene ether glycols ranging in molecular weight from 162 to 3000 as well as mixtures thereof. Likewise, blends of the polytetramethylene ether glycol and other polyether polyols and/or polyester polyols can be used.

The process for preparing the prepolymer or quasi-prepolymer hereof, generally, comprises the steps of (a) heating the monomeric methylene bis(phenylisocyanate) to a temperature of about 60° C., (b) adding the polytetramethylene ether glycol to the polyisocyanate at a constant rate over a period of about one hour, and (c) heating the reactants for one to two hours at 80° C.

The NCO content of the new isocyanate terminated prepolymer/quasi-prepolymer compositions of the present invention range from 0.5 percent by weight to 33.0 percent by weight.

The prepolymer and quasi-prepolymer products are useful "as is" or together with other components such as chain extenders, catalysts, blowing agents, fillers, and solvents in the formation of polyurethane elastomers, sealants, films and the like.

For a more complete understanding of the present invention reference is made to the following detailed description and accompanying examples.

DESCRIPTION OF THE PREFERRED EMBODIMENTS

As hereinabove noted, the present invention provides novel quasi-prepolymers and prepolymers which are liquid at low temperatures. The present compositions are the reaction product of methylene bis(phenylisocyanate) and polytetramethylene ether glycols. Such prepolymers and quasi-prepolymers utilizing the poly-tetramethylene ether glycols in combination with the monomeric methylene bis(phenylisocyanate) mixture contain at least 5 percent by weight of the 2,4'-isomer with polytetramethylene ether glycol.

The present invention defines a diisocyanate prepolymer which is liquid at room temperature (25° C.) and below to a temperature of −20° C. or lower. The composition comprises the reaction product of a methylene bis(phenylisocyanate) containing as little as about 5% by weight of the 2,4'-isomer; and a polytetramethylene ether glycol having a molecular weight of from 162 to 3000. The achievement of a liquid diisocyanate using the 2,4'-isomer in quantities smaller than 15% by weight is an unexpected result. Further, the formulation of the 2,4'-isomer of diisocyanate in combination with a polytetramethylene ether glycol to form a liquid diphenylmethane diisocyanate is not taught in the prior art.

The resulting diisocyanate prepolymers can be transported and stored at lower temperatures than previously possible. Also, even if the prepolymers are frozen they will thaw readily at room temperature, without additional heating. Finally, the polytetramethylene ether segments are essentially hydrophobic segments which provide enhanced compatibility with many of the traditionally hydrophobic polyether polyols useful in preparing polyurethanes as well as being useful in many applications where other prepolymers are not successfully used.

The prepolymer generally contains from about 10 to 90 percent by weight of the diisocyanate and from about 90 to 10 percent by weight of the glycol and, preferably, from about 10 to 60 percent by weight of the diisocyanate and from about 90 to 40 percent, by weight, of the glycol.

In general, the methylene bis(phenylisocyanate) compounds usable according to the instant invention must contain at least 5 percent by weight of the 2,4'-isomer of methylene bis(phenylisocyanate). Theoretically there is no upper limit to the amount of 2,4'-isomer which could be present in the isocyanate, but is generally present in levels of up to about 90 percent. Higher levels of the 2,4-isomer are desirable as the increased 2,4'-isomer concentration lowers the melting point of the isocyanate and improves certain end product properties. It has been found that products of the present invention containing the 2,4'-isomer are both stable and liquid at 15° C. for at least 24 hours. Products containing 50 percent by weight of the 2,4'-isomer are both stable and liquid at −20° C. for at least 24 hours. Accordingly, the methylene bis(phenylisocyanate) products used in the present invention will, generally, contain from about 5 percent to about 60 percent by weight of the 2,4'-isomer with the balance being the 4,4'-isomer and 2,2'-isomer and/or various MDI oligomers (the 2,2'-isomer and any dimer are generally present only in trace amounts). Preferably, the 2,4'-isomer content is from about 30 to about 60 percent by weight and most preferably from about 40 to about 50 percent by weight.

The polyol component used to prepare the NCO-terminated prepolymers and/or quasi-prepolymers is a polytetramethylene ether glycol ranging in molecular weight from 162 to about 3000 and preferably from about 162 to about 2000. The glycol is a commercially available product sold by BASF Corporation under the name PolyTHF ®.

The polytetramethylene ether glycol may be used alone or as a mixture of such varying molecular weight glycols. Likewise, the glycol may be used as a blend thereof with a polyether glycol or a polyester glycol.

Suitable polyether polyols are those prepared by the oxyalkylation of a dihydric alcohol such as ethylene glycol, propylene glycol, butylene glycol, neopentyl glycol, 1,6-hexane diol, hydroquinone, resorcinol, the bisphenols, aniline and other aromatic monoamines, aliphatic monoamines and monoesters of glycerine with ethylene oxide, propylene oxide, butylene oxide and the like. The oxyalkylation of such dihydric alcohols is, of course, well known.

Polyester polyols are those which are conventionally employed in the art and which comprise the reaction product of a polycarboxylic acid with an excess of polyol. As noted, these polyester glycols are well known and commercially available.

Where a blend is used, generally, it will contain from about 95 to 5 percent by weight of the polytetramethylene ether glycol and from about 5 to 95 percent, by weight, of the polyether polyol. Preferably, the blend will contain from about 80 to about 10 percent, by weight, of the polytetramethylene ether glycol and from about 10 to 80 percent by weight of the polyether glycol.

In preparing the prepolymers and quasi-prepolymers hereof the materials are reacted in an NCO/OH ratio of about 1.1 to about 100 and preferably from about 1.5 to about 80. However, it is important that there be an excess of isocyanate to ensure that the prepolymers are fully isocyanate terminated.

The glycol and isocyanate can be reacted at temperatures ranging anywhere from 25° C. up to 100° C. Preferably, the reaction temperature is from about 40° C. to about 90° C. and most preferably, from about 60° C. to about 80° C. The reaction time ranges from 1 to 10 hours, and preferably from 1 to 2 hours.

The isocyanate content of the products of the process generally amounts to from at low as 70 weight percent to as high as about 90 weight percent. The final product having an NCO-content of from about 0.50 to about 33.0 percent by weight based on the weight of the NCO groups relative to the weight of the total composition.

Viscosity of the resulting prepolymer or quasi-polymer is dependent upon the amount of 2,4'-isomer present in the reaction. The greater the concentration of the 2,4'-diisocyanate present, the higher the viscosity of the resulting product. Preferably the viscosity is less than 1000 cps at 25° C., preferably less than 500 cps.

The products of the process can be used "as is" for all types of different polyaddition reactions in the plastics industries, and may be reacted with chain extenders, catalysts, solvents and the like in flexible polyurethane polymers are desired, such as polyurethane elastomers, sealants, films and the like.

In preparing polyurethane polymers, the NCO-terminated prepolymers may be reacted, alone, or with another isocyanate and a polyhydric compound according to conventional polyurethane technology, in the presence of catalysts, chain extenders, etc. and the like. In particular, mixtures of the prepolymers with additional 2-ring MDI or with polymeric MDI are especially useful. Such mixtures may be made by first forming the prepolymer and then blending in the additional isocyanates, or by first preparing a mixture of isocyanates and then preparing the prepolymer.

By the term "polyurethane" is meant a polymer whose structure contains predominantly urethane

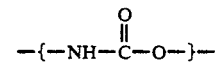

linkages between repeating units. Such linkages are formed by the addition reaction between an organic isocyanate group R-[NCO]and an organic hydroxyl group [HO]—R. In order to form a polymers, the organic isocyanate and hydroxyl group-containing compounds must be at least difunctional. However, as modernly understood, the term "polyurethane" is not limited to those polymers containing only urethane linkages, but includes polymers containing allophanate, biuret, carbodiimide, oxazolinyl, isocyanurate, uretdione, and urea linkages in addition to urethane. The reactions of isocyanates which lead to these types of linkages are summarized in the Polyurethane Handbook, Gunter Vertel, Ed., Hanser Publications, Munich, c1985, in Chapter 2, pages 7–41; and in *Polyurethanes: Chemistry and Technology*, J. H. Saunders and K. C. Frisch, Interscience Publishers, New York, 1963, Chapter III, pages 63–118. In addition to polyols (polyhydroxyl-containing monomers), the most common isocyanate-reactive monomers are amines and alkanolamines. In these cases, reaction of the amino group leads to urea linkages interspersed within the polyurethane structure.

The urethane forming reaction is generally catalyzed. Catalysts useful are well known to those skilled in the art, and many examples may be found for example, in the *Polyurethane Handbook*, Chapter 3, Section 3.4.1 on pages 90–95; and in *Polyurethanes: Chemistry and Technology* in Chapter IV, pages 129–217. Most commonly utilized catalysts are tertiary amines and organotin compounds, particularly dibutyltin diacetate and dibutyltin dilaurate. Combinations of catalysts are often useful also.

In the preparation of polyurethanes, the isocyanate is reacted with the active hydrogen-containing compound(s) in an isocyanate to active hydrogen ratio of from 0.5 to 1 to 10 to 1. The "index" of the composition is defined as the -NCO/active hydrogen ratio multiplied by 100. While the extremely large range described previously may be utilized, most polyurethane processes have indices of from 90 to about 120 or 130, and more preferably from 95 to about 100. In the case of polyurethanes which also contain significant quantities of isocyanurate groups, indices of greater then 200 and preferably greater than 300 may be used in conjunction with a trimrization catalyst in addition to the usual polyurethane catalysts. In calculating the quantity of active hydrogens present, in general all active hydrogen containing compounds other then non-dissolving solids are taken into account. Thus the total is inclusive of polyols, chain extenders, functional plasticizers, etc.

Hydroxyl group-containing compounds (polyols) useful in the preparation of polyurethanes are described in the *Polyurethane Handbook* in Chapter 3, Section 3.1 pages 42–61; and in *Polyurethanes: Chemistry and Technology* in Chapter II, Sections III and IV, pages 32–47. Many hydroxyl-group containing compounds may be used, including simple aliphatic glycols, dihydroxy aromatics, bisphenols, and hydroxy-terminated polyethers, polyesters, and polyacetals, among others. Extensive lists of suitable polyols may be found in the above references and in many patents, for example in columns 2 and 3 of U.S. Pat. No. 3,652,639; columns 2–6 of U.S. Pat. No. 4,421,872; and columns 4–6 of U.S. Pat. No. 4,310,632; these three patents being hereby incorporated by reference.

Preferably used are hydroxyl-terminated polyoxyalkylene and polyester polyols. The former are generally prepared by well known methods, for example by the base catalyzed addition of an alkylene oxide, preferably ethylene oxide (oxirane), propylene oxide (methyloxirane) or butylene oxide (ethyloxirane) to an initiator molecule containing on the average two or more active hydrogens. Example of preferred initiator molecules are dihydric initiators such as ethylene glycol, propylene glycol, butylene glycol, neopentyl glycol, I,6-hexanediol, hydroquinone, resorcinol, the bisphenols, aniline and other aromatic monoamines, aliphatic monoamines, and monoesters of glycerine; trihydric initiators such as glycerine, trimethylolpropane, trimethylolethane, N-alkylphenylenediamines, mono-, di-, and trialkanolamines; tetrahydric initiators such as ethylene diamine, propylenediamine, 2,4'-, 2,2'-, and 4,4'-methylenedianiline, toluenediamine, and pentaerythritol; pentahydric initiators such as diethylene-triamine; and hexahydric and octahydric initiators such as sorbitol and sucrose.

Addition of alkylene oxide to the initiator molecules may take place simultaneously or sequentially when more than one alkylene oxide is used, resulting in block, heteric, and block-heteric polyoxyalkylene polyethers. The number of hydroxyl groups will generally equal the number of active hydrogens in the initiator molecule. Processes for preparing such polyethers are described both in the *Polyurethane Handbook* and *Polyurethanes: Chemistry and Technology* as well as in many patents, for example U.S. Pat. Nos. 1,922,451; 2,674,619; 1,922,459; 3,190,927; and 3,346,557. The various homopolymeric, block polymeric, heteric polymeric and block heteric polymeric polyoxyalkylene polyols each possess distinct properties which enhance or limit their utilization in any given embodiment.

Polyester polyols also present preferred polyurethane-forming reactants. Such polyesters are well known in the art and are prepared simply by polymerizing polycarboxylic acids or their derivatives, for example their acid chlorides or anhydrides, with a polyol. Numerous polycarboxylic acids are suitable, for example malonic acid, citric acid, succinic acid, glutaric acid, adipic acid, pimelic acid, azelaic acid, sebacic acid, maleic acid, fumaric acid, terephthalic acid, and phthalic acid. Numerous polyols are suitable, for example the various aliphatic glycols, trimethylolpropane and trimethylolethane, 2-methylglucoside, and sorbitol. Also suitable are low molecular weight polyoxyalkylene glycols such as polyoxyethylene glycol, polyoxypropylene glycol, and block heteric polyoxyethylene-polyoxypropylene glycols. These lists of dicarboxylic acids and polyols are illustrative only, and not limiting. An excess of polyol should be used to ensure hydroxyl termination, although carboxyl groups are also reactive with isocyanates. Methods of preparation of such polyester polyols are give in the *Polyurethane Handbook* and in *Polyurethanes: Chemistry and Technology*.

Also suitable as the polyol are polymer modified polyols, in particular the so-called graft polyols. Graft polyols are well known to the art, and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,828,201; particularly in columns 2–8 and the Examples of U.S. Pat. No. 4,690,956; and in U.S. Pat. No. 4,524,157; all of which patents are herein incorporated by reference.

Non-graft polymer modified polyols are also preferred, for example those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersion also containing biuret linkages as taught by U.S. Pat. No. 4,359,541. Other polymer modified polyols may be prepared by the in situ size reduction of polymers until the particle size is less than 20 $\mu$m, preferably less than 10 $\mu$m.

Also useful in preparing polyurethanes are monomers containing other functional groups which are reactive with isocyanates. Examples of these are preferably the amines, for example the substituted and unsubstituted toluenediamines and methylenedianilines; the alkanolamines; the amino-terminated polyoxyalkylene polyethers; and sulfhydryl terminated polymers, to name but a few. The alkanolamines and amines, particularly diamines, are particularly useful, as the amino group reacts faster than the hydroxyl group and thus these molecules can act as isocyanate chain extenders in situ without the need to prepare prepolymers. Examples of hindered, alkyl substituted aromatic diamines which are particularly useful are disclosed in U.S. Pat. No. 4,218,543.

Chain extenders may also be useful in the preparation of polyurethanes. Chain extenders are generally considered to be low molecular weight polyfunctional compounds or oligomers reactive with the isocyanate group. Aliphatic glycol chain extenders commonly used include ethylene glycol, propylene glycol, 1,4-butanediol, and 1,6-hexanediol. Amine chain extenders include aliphatic monoamines but especially diamines such as ethylenediamine and in particular the aromatic diamines such as the toluenediamines and the alkylsubstituted (hindered) toluenediamines.

Other additives and auxiliaries are commonly used in polyurethanes. These additives include plasticizers, flow control agents, fillers, antioxidants, flame retardants, pigments, dyes, mold release agents, and the like.

quantity of methylene bis(phenylisocyanate). With stirring the polytetramethylene glycol was added thereto at a constant rate over a period of one hour, with the temperature being held at 60° C. The reaction mixture was then heated to a temperature of about 80° C. for one to two hours. The product was then characterized by the determination of NCO content and viscosity. Table I set forth below sets forth the ingredients and their amounts used to prepare the quasi-prepolymers.

ELASTOMER FROM THE PREPOLYMERS OF THE PRESENT INVENTION

The prepolymer of Example 7 (93.3 parts) was placed in a container and heated to 60° C. Thereafter 6.7 grams of 1,4-butanediol (isocyanate index 105) was added and mixed. An exotherm to 80° C. was observed. The contents were mixed thoroughly, degassed and cast into a open mold preheated to 120° C. The mold was placed in the oven for six minutes at 120° C. The product was a polyurethane elastomer with superior abrasion resistance.

TABLE 1

|  | Isocyanate[1] Parts | Polytetramethylene Glycol Time | Polytetramethylene Glycol Amount | Dipropylene Glycol | P-410%[2] | % NCO | Visc.[3] cps. 25° C. |
|---|---|---|---|---|---|---|---|
| Example 1 | 77.48 | A[4] | 22.52 | — | — | 22.8 | 291 |
| Example 2 | 84.38 | B[5] | 15.62 | — | — | 22.7 | 434 |
| Example 3 | 75.11 | C[6] | 24.89 | — | — | 22.9 | 245 |
| Example 4 | 72.35 | D[7] | 27.66 | — | — | 22.6 | 407 |
| Example 5 | 87.21 | B[5] | 6.39 | 6.39 | — | 22.6 | 945 |
| Example 6 | 82.81 | B[5] | 8.59 | — | 8.60 | 22.8 | 367 |
| Example 7 | 43.50 | A[4] | 56.5 | — | — | 7.0 | |

[1] a 50/50 isomeric blend of 2,4' and 4,4'-methylene bis(phenylisocyanate).
[2] a propylene oxide adduct of propylene glycol having a molecular weight of 430 sold by BASF Corp.
[3] as determined by Brookfield Viscometer.
[4] a 650 molecular weight polytetramethylene glycol.
[5] a 250 molecular weight polytetramethylene glycol.
[6] a 1000 molecular weight polytetramethylene glycol.
[7] a 2000 molecular weight polytetramethylene glycol.

Many such additives and auxiliary materials are discussed in the *Polyurethane Handbook* in Chapter 3, Section 3.4, pages 9–109; and in *Polyurethanes: Chemistry and Technology,* Part II, Technology.

In practicing a polyurethane elastomer in accordance herewith, preferably, the prepolymer hereof is reacted, alone, or with an additional polyisocyanate.

Where an additional polyisocyanate is used, the prepolymer is employed in an amount ranging from about 10 to 90 percent, by weight, and the additional polyisocyanate is present in an amount ranging from about 90 to 10, percent, by weight, and the additional polyisocyanate will be present in an amount ranging from about 60 to 30 percent, by weight.

Although any of the above-enumerated polyisocyanates can be used, it is preferred that the additional polyisocyanate be toluene diisocyanate, methylenediphenylene diisocyanate, polymethylene polyphenyl polyisocyanate, or isocyanates of the aliphatic class.

For a more complete understanding of the present invention, following are specific illustrative examples showing the preparation of various prepolymers in accordance with the present invention. In the examples all parts are by weight absent contrary indications.

EXAMPLES I–VII

These examples illustrate the preparation of a quasi-prepolymer in accordance with the present invention.

Into a suitable reaction vessel equipped with an addition funnel, an inlet for $N_2$ gas, heating means for maintaining the vessel at 60° and a stirrer, was charged a

I claim:

1. A diisocyanate prepolymer, which is liquid at temperatures ranging from about −20° C. or lower to about 25° C., comprising the reaction product of:
   (a) a methylene bis(phenylisocyanate) containing at least about five percent by weight of the 2,4'-isomer; and
   (b) a polytetramethylene ether glycol having a molecular weight from about 162 to about 3000.

2. The prepolymer of claim 1 wherein the methylene bis(phenylisocyanate) comprises:
   (a) from about 5 to about 60 percent by weight of the 2,4'-isomer, and
   (b) from about 95 to about 40 percent by weight of the 4,4'-isomer.

3. The prepolymer of claim 2 wherein the methylene bis(phenylisocyanate) comprises:
   (a) from about 40 to about 50 percent by weight of the 2,4'-isomer, and
   (b) from about 60 to about 40 percent by weight of the 4,4'-isomer.

4. The prepolymer of claim 1 wherein the diisocyanate prepolymer has an NCO-content of from about 0.5 percent by weight to about 33 percent by weight.

5. The diisocyanate prepolymer of claim 1 wherein
   (a) the diisocyanate is present in an amount ranging from about 10 to about 90 percent, by weight; and
   (b) the polytetramethylene ether glycol is present in an amount ranging from about 90 to about 10 percent, by weight.

6. The prepolymer of claim 1 which further comprises:
a second polyol which is selected from the group consisting of a polyether polyol, a polyester polyol and mixtures thereof.

7. The prepolymer of claim 6 wherein the second polyol is present in an amount ranging from about 5 to 95 percent, by weight, based on the total weight of the prepolymer.

8. The diisocyanate prepolymer of claim 1 wherein the viscosity at 25° C. is less than about 1000 cps.

9. The diisocyanate prepolymer of claim 1 wherein the viscosity at 25° C. is less than about 500 cps.

10. The diisocyanate prepolymer of claim 1 wherein the prepolymer is storage stable at 0° C.

11. The diisocyanate prepolymer of claim 1 wherein the prepolymer is storage stable at −15° C.

12. The diisocyanate prepolymer of claim 8 wherein the prepolymer is storage stable at 0° C.

13. The diisocyanate prepolymer of claim 9 wherein the prepolymer is storage stable at 0° C.

14. The diisocyanate prepolymer of claim 8 wherein the prepolymer is storage stable at −15° C.

15. The diisocyanate prepolymer of claim 9 wherein the prepolymer is storage stable at 0° C.

* * * * *